Aug. 27, 1957 C. P. HOBBS 2,803,847
VACUUM TREE LEAF COLLECTION UNIT
Filed March 5, 1954 2 Sheets-Sheet 1
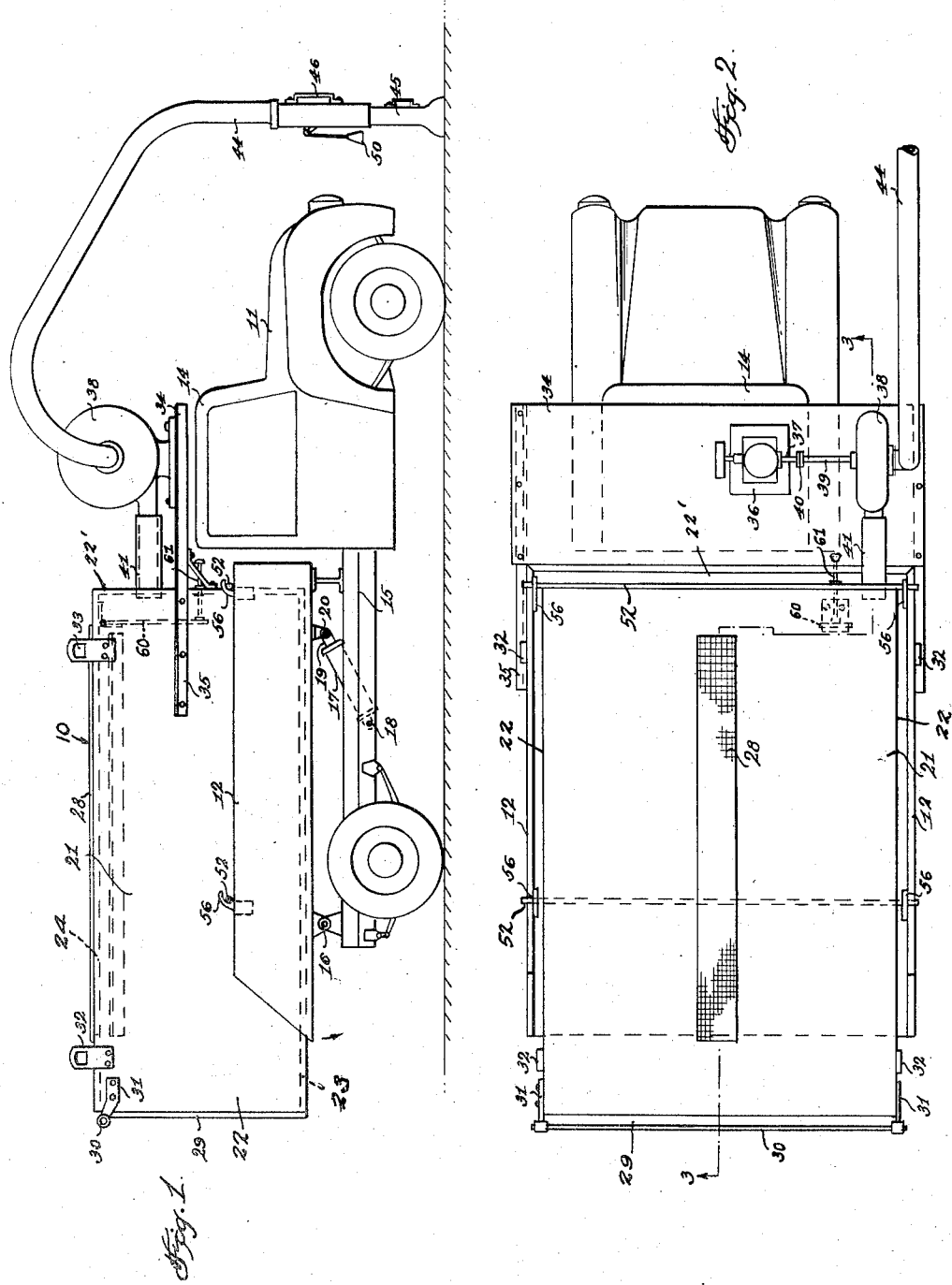
CLEMENT P. HOBBS INVENTOR
BY
ATTORNEYS.

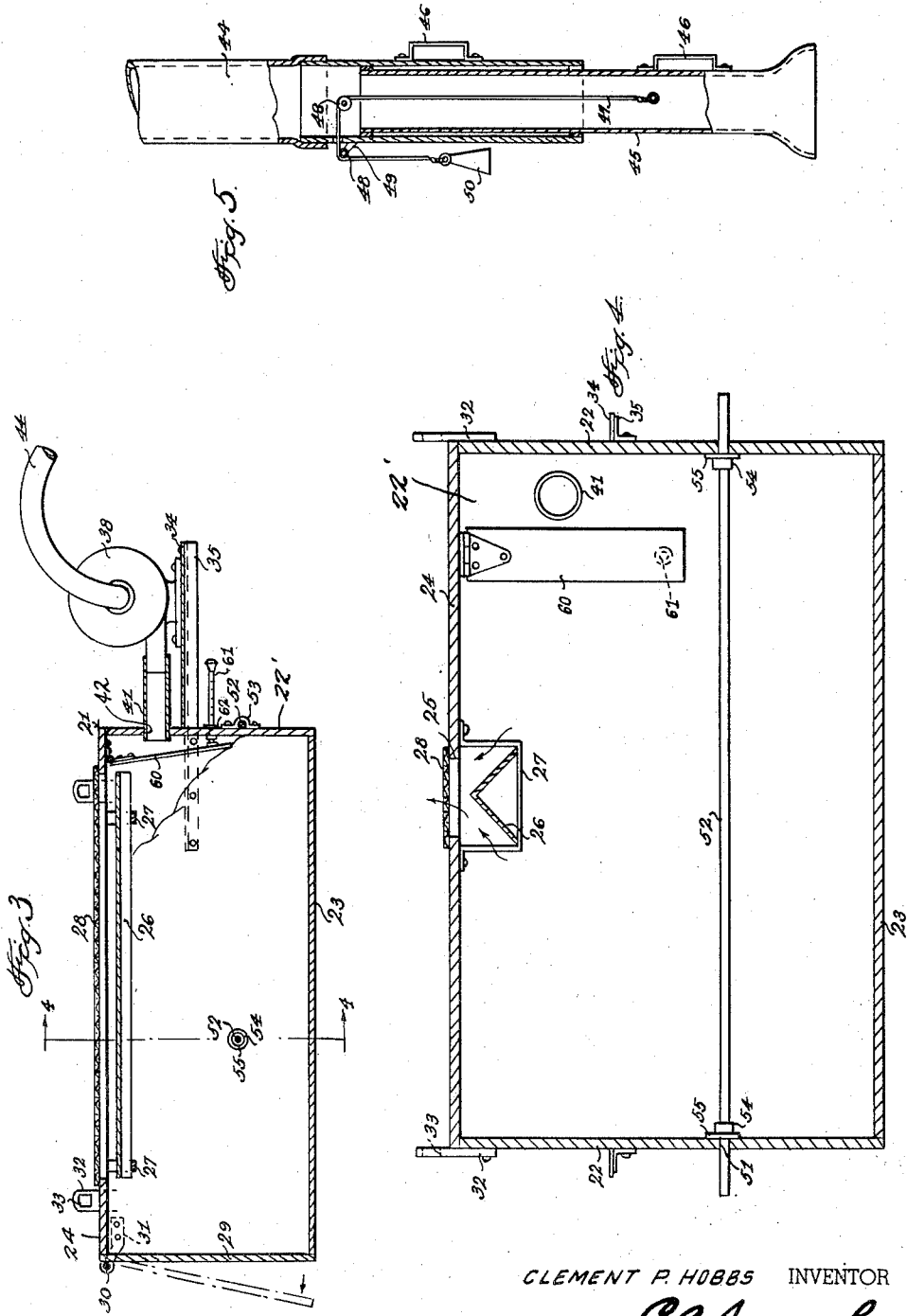

United States Patent Office 2,803,847
Patented Aug. 27, 1957

2,803,847
VACUUM TREE LEAF COLLECTION UNIT
Clement P. Hobbs, North Sacramento, Calif.
Application March 5, 1954, Serial No. 414,265
2 Claims. (Cl. 15—314)

This invention relates to a disposal unit for tree leaves and the like and more particularly to a tree leaf collection unit mounted on a truck for collecting tree leaves, lightweight trash and/or dirt from the surface of streets as from the gutters by a vacuum.

It is an object of this invention to provide a vacuum tree leaf collection unit of the kind to be more particularly described hereinafter to be removably mounted on a truck, as a lift truck, so that the unit may be easily manipulated advantageously on crowded streets having street parking for collecting the leaves and toward and into disposal areas where the collected leaves may be discharged.

It is another object of this invention to provide a vacuum tree leaf collection unit of this kind having a receptacle-like body detachably mounted on a dump truck whereby the receptacle-like body may be readily hooked on or removed from the truck by any available crane or hoist. The vacuum pump and flexibly connected nozzle are mounted directly onto the receptacle for movement therewith.

Other and further objects and advantages of the invention will be hereinafter described and the novel features thereof defined in the appended claims.

In the drawings:

Fig. 1 is a side elevation of a tree leaf collection unit constructed according to an embodiment of my invention.

Fig. 2 is a plan view thereof, partly broken away.

Fig. 3 is a longitudinal section, partly broken away, taken on the line 3—3 of Fig. 2.

Fig. 4 is a transverse section taken on the line 4—4 of Fig. 3.

Fig. 5 is an enlarged longitudinal elevation, partly broken away and partly in section, of the vacuum nozzle removed from the collection unit.

Heretofore in the disposal of leaves, trash and dirt in the streets of a city or adjacent thereto it has been the custom for the city or some organization therein to collect the leaves and dispose of them at a point remote from the place where they were collected. The custom of vacuum collection of the leaves and dirt has developed and this vacuum collection has resulted in the use of trucks carrying the vacuum means and the receptacle into which the leaves to be disposed of may be deposited. It is a principal object of this invention to provide a device of this general nature having the receptacle detachably secured to the vehicle, as a dump truck, whereby the leaves may be collected to be deposited within the receptacle and then the receptacle and the vacuum collecting means carried off to a suitable location for emptying the receptacle in an area at which the collected leaves and other dirt may be properly disposed of.

Heretofore in the use of vacuum collection units of this same general nature large trucks have been used even to the point of using trailer trucks. Such use of trailer trucks is frequently prohibited due to the size of the streets on which the truck must travel, some of the streets providing for street parking or parking adjacent to the curb. With the use of a smaller type of truck as a dump truck, the receptacle and vacuum collecting means may be readily moved about by the truck even on such crowded parked-on streets both during the time of the collection of the leaves and after.

The collection unit designated generally by the reference numeral 10, constructed according to my invention, may be adequately travelled about on a street, even a street permitting street parking.

The collection unit 10 is carried about on a dump truck 11, the dump truck 11 being provided with a box 12 rearwardly of the cab 14. By such arrangement an operator may be seated in the cab 14 for properly moving the collection unit 10 to the place where it is desired to collect tree leaves.

The box 12 is pivotally mounted at the rear end of the dump truck 11 on a pivot pin or pins 16 which extend transversely of the dump truck.

For actuating the pivotal frame 12 a cylinder 17 is provided which is pivotally connected at one end thereof to the fixed frame of the dump truck 11 by a pivot 18, the cylinder 17 having a piston slidable therein with the piston rod 19 extending outwardly therefrom to be pivotally connected by a pivot 20 which is carried by the bottom wall of the box 12.

A tree leaf collecting receptacle 21 is removably carried by the box 12. The receptacle 21 is provided with vertically extending side walls 22 which extend vertically upward from a bottom wall 23 and are connected at their upper ends by a transversely extending top wall 24. The top wall 24 is formed with a longitudinally extending opening 25 therein which opens upwardly from the receptacle.

A baffle 26 is carried by the receptacle 21 therein, the baffle 26 being inverted V-shaped in configuration and held in place by supports 27 which depend from the top wall 24 and engage the lower surface of the baffle 26. A screen 28 covers the longitudinal opening 25 being secured at its opposite longitudinal edges to the longitudinal edges of the opening 25.

The receptacle 21 is provided with a pivotally mounted rear wall 29 which may be manually opened or preferably opened by the force of gravity when the dump truck has been actuated for lifting the front end of the box 12 about the pivot 16 thereof. A hinge pin 30 is carried by a pair of transversely spaced apart brackets 31 which are fixed to the upper edge of the receptacle on the opposite sides thereof.

The receptacle 21 may be lifted from the box 12 of the dump truck when the dump truck is not used for collection of leaves and this lifting of the receptacle may be accomplished by any suitable and available hoists or lifts. Vertically extending lifting lugs 32 are fixed to the extreme upper end of the sides to be engaged by the lifting means of the device used for raising or lowering the receptacle when and as desired. The lifting lugs 32 are provided with openings 33 therethrough for receiving hooks or rods which are connected to and operated by the lifting device being used.

When the dump truck 11 is to be used as a vehicle or carrier for a collection unit, the receptacle 21 may be deposited within the box 12 and the receptacle 21 locked in the box 12 by the locking rods 52. The release of the receptacle 21 from the box 12 may be affected by disengaging the rods 52 from the hooks or lugs 56.

A platform 34, rectangular in configuration is supported at one end of the receptacle 21 by a pair of longitudinally extending arms 35 secured to the side walls 22 and a motor 36 having a motor shaft 37 is carried by the upper surface of the platform 34 along with a blower 38 having a blower shaft 39 which is coupled to the motor shaft 37 by a suitable coupling member 40 as clearly shown in the drawings.

A discharge pipe 41 is connected at one end to the blower 38 adjacent the periphery thereof the discharge pipe 41 extending freely through an opening 42 in the front wall of the receptacle.

An intake pipe 44, flexible in structure, is connected to the center portion of one side of the blower 38 having a nozzle pipe 45 extending outwardly from the blower 38 and outwardly of the truck 11 for reaching into a position to suck up or take in any tree leaves, trash or other material to be contained in the receptacle.

The nozzle pipe 45 may preferably be formed of substantially rigid material for connection to the extended open end of the flexible intake pipe 44 and the end of the nozzle pipe 45 may be flared outwardly to form a nozzle for engagement over the leaves to be picked up by the vacuum pressure excited by the blower 38. As the nozzle pipe 45 and nozzle at the outermost end thereof is freely movable relative to the truck 11 due to the flexible member 44 when the collection unit 10 is used to collect the tree leaves handles 46 which are formed on the outermost end of the intake pipe 44 and the nozzle pipe 45 are grasped by a person whereby the nozzle pipe 45 may be moved about by a person remote from the truck. The nozzle pipe 45 is mounted for free sliding movement within the end of the intake pipe 44.

A flexible cord 47 is connected at one end interiorly of the nozzle pipe 45 and extends upwardly for free movement over the pulleys 48 which are carried by the pulley brackets 49 mounted on the intake pipe, adjacent the open end thereof.

A counter weight 50 is secured to the end of the cord 47, remote from the nozzle pipe 45 to pull the nozzle pipe 45 interiorly of the intake pipe 44 and the counter weight 50 may be substantially the same weight as the nozzle pipe 45 so that the nozzle pipe may be moved at the will of the person actuating the collection unit 10.

In the use and operation of the collection unit 10, described above, openings 51 are formed in the side walls of the receptacle for receiving therethrough a rod 54 which extends outwardly, at the opposite ends thereof beyond the side walls of the receptacle, the outer extensions of the rod 52 substantially forming lugs on the side walls of the receptacle. A pair of rod brackets 53 are secured to the forward end of the receptacle for receiving therethrough another rod 52 so that one rod 52 will extend through the receptacle, intermediate the length thereof, and another rod 52 will extend through the rod bracket 53 at the forward end of the receptacle thus providing supporting means for the receptacle intermediate the length thereof and adjacent one end.

Each of the rods 52 is provided with a sleeve 54 adjacent to and spaced from an end thereof which is engageable with a bearing plate 55, fixed to the inner surface of the side walls 21 of the receptacle, thus holding the rod 53 against free sliding movement laterally of the receptacle.

Crescent shaped hooks 56 are secured to the upper edges of the box 12, adjacent to the opposite ends thereof within which the outwardly extending portion of the rods 52 are received upon sliding movement of the receptacle longitudinally of the box 12 at the time that the receptacle is placed within the box or removed therefrom.

In the use and operation of the collection unit 10, described above, the receptacle 21 will preferably be free from the dump truck 11. The receptacle 21 may then be lifted, by way of a hoist, engaging the lugs 32 thereof. With the receptacle thus supported by the hoisting means the dump truck 11 may then be driven under the receptacle at which time the receptacle is deposited within the box 12. Initially the receptacle will be at the forwardmost end of the box 12 free from engagement with the crescent shaped hooks 56. The receptacle 21 may then be moved rearwardly of the truck to engage the rods 52 within the hooks and thus hold the receptacle from sliding movement longitudinally rearwardly of the truck 11.

In order to firmly pack the leaves or refuse in the box 21 and prevent the collected leaves from clogging up the intake pipe 41 there is formed a packing member or plate 60 hingedly mounted on the under surface of the top wall 24 for contact with the collected leaves. The packing member 60 is positioned adjacent to the inner open end of the pipe 41. To indicate the quantity of the refuse in the box 21, an indicator rod 61 is secured to plate 60 and slidable in the front wall 22'. As the box 21 fills up the inward movement of plate 60 is gradually reduced so that the position of rod 61 relative to wall 22' will indicate the volume of material in box 21. A rod supporting tube 62 is carried by the front wall 22' projecting interiorly of the box and the rod 61 is provided with longitudinally spaced notches or other indicia which may be easily seen from the outside of the box to readily indicate the fullness of the box.

While the specific details of one embodiment of this invention have been herein shown and described, the invention is not confined thereto as changes and alterations may be made without departing from the spirit and scope thereof as defined in the appended claims.

I claim:

1. A tree leaf collecting unit for mounting on a truck body, a collection box engageable on said body, a pair of hooks carried by each side of said body, a pair of box locking rods extending transversely through said box and engaging said hooks to detachably secure said box on said body, a platform projecting forwardly of and secured to said box, a suction-blower on said platform, a tubular connection between the exhaust side of said blower and the front wall of said box, an elongated flexible hose secured at one end to the suction side of said blower, a pickup nozzle slidingly carried by the other end of said hose, power means for said blower, a material packing plate swingably disposed in said box adjacent the forward end thereof, and a combined plate operator and volume gauge secured to said plate and slidingly engaging through the front wall of said box.

2. A tree leaf collecting unit as set forth in claim 1 wherein said box is formed with a screened air exhaust opening, and an inverted V-shaped baffle carried by said box confronting said exhaust opening.

References Cited in the file of this patent

UNITED STATES PATENTS

| 427,185 | McDill | May 6, 1890 |
| 796,207 | Harbour | Aug. 1, 1905 |
| 1,119,545 | Shaw | Dec. 1, 1914 |
| 1,560,612 | Sims | Nov. 10, 1925 |
| 2,184,384 | Gregoric | Dec. 26, 1939 |
| 2,286,245 | Wilson et al. | June 16, 1942 |
| 2,308,648 | DeVry | Jan. 19, 1943 |
| 2,361,909 | Bernal | Nov. 7, 1944 |
| 2,523,808 | Boyce et al. | Sept. 26, 1950 |
| 2,716,501 | Geiger | Aug. 30, 1955 |

FOREIGN PATENTS

| 17,862 | Great Britain | 1907 |
| 909 | Great Britain | Jan. 20, 1915 |
| 168,790 | Great Britain | Sept. 15, 1921 |
| 486,505 | Great Britain | June 2, 1938 |